United States Patent [19]

Hussain et al.

[11] 3,868,461

[45] Feb. 25, 1975

[54] ESTER OF 3,4-DIHYDROXY-ALPHA (ISOPROPYLAMINO) METHYL BENZYL ALCOHOL, COMPOSITION AND ANTI-ASTHMA USE THEREOF

[75] Inventors: Anwar A. Hussain; James E. Truelove, both of Lawrence, Kans.

[73] Assignee: Interx Corporation, Lawrence, Kans.

[22] Filed: Nov. 22, 1972

[21] Appl. No.: 308,771

[52] U.S. Cl........... 424/311, 260/343.7, 260/479 R, 260/570.5 C, 260/570.6, 260/592, 424/280
[51] Int. Cl....................... A61k 27/00, C07c 93/26
[58] Field of Search................. 260/479 R; 424/311

[56] References Cited
UNITED STATES PATENTS

| | | | |
|---|---|---|---|
| 3,180,887 | 4/1965 | Zolss et al. | 260/479 |
| 3,657,244 | 4/1972 | Mentrap | 260/256 |

OTHER PUBLICATIONS

Bretschneider Monatsh., vol. 77 (1947), pp. 385–97.

Primary Examiner—James A. Patten
Attorney, Agent, or Firm—Norman H. Stepno; Charles N. Blitzer

[57] ABSTRACT

A novel ester of the formula:

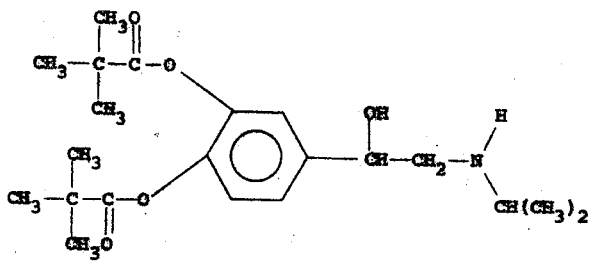

and the non-toxic pharmaceutically acceptable acid addition salts thereof. The compound evidences increased stability and lipoidal solubility and is extremely valuable in the treatment of conditions responsive to sympathomimetic agents and especially the management of bronchial asthma.

8 Claims, No Drawings

ESTER OF 3,4-DIHYDROXY-ALPHA (ISOPRORPYLAMINO) METHYL BENZYL ALCOHOL, COMPOSITION AND ANTI-ASTHMA USE THEREOF

BACKGROUND OF THE INVENTION

The present invention relates to both a novel and useful therapeutic ester of 3,4-dihydroxy-α[(isopropylamino)methyl]-benzyl alcohol, commonly known as isoproterenol, and to pharmaceutical compositions containing same. More particularly, the invention pertains to a new compound represented by Formula 1:

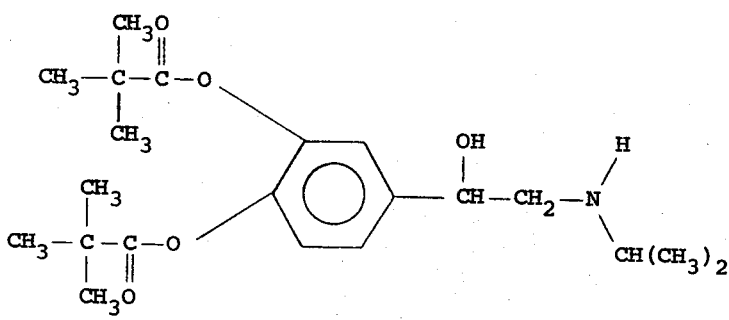

(Formula 1)

and its pharmaceutically acceptable, non-toxic acid addition salts. The compound and its salts are useful as a broncholytic agent, and can be administered per se or in the form of a composition comprised of the compound of the invention and a pharmaceutically acceptable carrier therefor.

Isoproterenol is a well-known sympathomimetic amine which acts almost exclusively on the β receptors or postganglionic adrenergic nerves in the sympathetic nervous system and, therefore, the administration of isoproterenol generally produces, among other things, a cardiac excitatory action manifested by tachycardia, palpitation and an increase in the force of contraction of the heart muscle, dilation of vascular beds supplying skeletal muscle, and relaxation of bronchial muscle. As a consequence of the foregoing, isoproterenol is clinically significant as a bronchodilator in respiratory disorders such as bronchial asthma, and as a cardiac stimulant in heart bloc. However, a number of inherent disadvantages are associated with this prior art compound which have substantially precluded the widespread acceptance of isoproterenol in its principal field of use as a bronchodilator.

One of these disadvantages is the action on the heart referred to above which in certain instances is the desired pharmacological response, but when isoproterenol is to be utilized in the treatment of bronchial asthma it is usually employed in large doses in the form of an inhalation mist and as a result the normally slight cardiac action of the drug is accentuated to such an extent that the resultant tachycardia and palpitation become undesirable side effects. Another disadvantage with the prior art compound is its instability to both air and light, as well as to chemical attack by many agents that are conventionally used in pharmaceutical preparations. Past attempts by the prior art to overcome the problem of instability have not met with any acceptable success. One such attempt involved acidifying solutions containing the drug which solutions were then irritating to body tissue, and if these solutions were later adjusted to a physiological pH, the free drug frequently precipitated resulting in the deterioration of the product. It has also been suggested to protect the drug against oxidative deterioration by the addition of the anti-oxidant sodium bisulfite to a solution containing the drug. It was found, however, that this anti-oxidant chemically attacked the aliphatic side chain of the drug to form a biologically inactive derivative thereof. Moreover, the prior art 3,4-dihydroxy-α-[(isopropylamino)methyl] benzyl alcohol suffered from the disadvantage of negligible lipoid solubility attributed to its hydrophilic phenolic hydroxyl groups which tended to restrict the medical application of the drug. Therefore, there exists an immediate and pressing need for a new and useful pharmaceutical compound that possesses therapeutic properties useful for treating bronchial asthma, while remaining essentially free from the unwanted disadvantages associated with the prior art compounds.

SUMMARY OF THE INVENTION

Accordingly, it is an immediate object of this invention to provide a novel pharmaceutical compound and its acceptable acid addition salts that are useful for treating bronchial asthma and as a sympathomimetic agent.

Another object of the invention is to provide a novel and useful ester of 3,4-dihydroxy-α-[isopropyl)methyl]benzyl alcohol and its acceptable salts that are essentially free from the unwanted effects associated with the prior art.

Still another object of the invention is to provide a new and useful 3,4-dipivaloxy-α-[(isopropylamino)methyl] benzyl alcohol that possesses increased stability and solubility and can be administered in conventional pharmaceutical formulations.

Yet still another object of the invention is to provide the compound 3,4-dipivaloxy-α-[(isopropylamino)methyl]benzyl alcohol as a useful therapeutic agent that has improved lipoid solubility for enhanced resorption when administered to warm-blooded animal tissues.

Another object of the invention is to provide 3,4-dipivaloxy-α-[isopropylamino)methyl]benzyl alcohol that can be administered per se or can be dispensed in aerosols and other types of pharmaceutical formulations to warm-blooded animals to produce a local or systemic physiological or pharmacological beneficial effect.

Other objects, features and advantages of the invention will be apparent to those skilled in the art from the detailed description of the invention which follows, taken in conjunction with the accompanying claims.

DETAILED DESCRIPTION OF THE INVENTION

In attaining the objects, features, and advantages of the present invention, it has now been found that the compound embraced by Formula 1

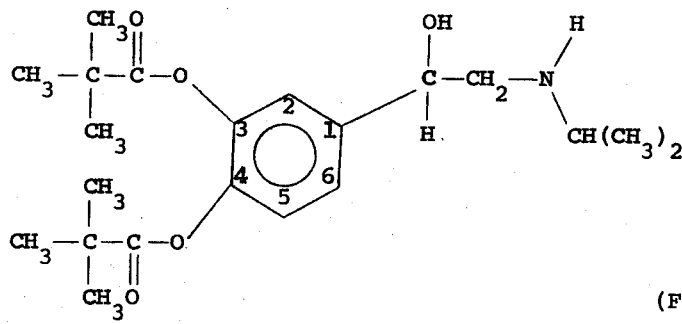

(Formula 1)

and its pharmaceutically acceptable salts possess heretofore unknown advantageous properties and are extremely valuable in the management of bronchial asthma, and for use as a general sympathomimetic agent that acts on postganglionic adrenergic nerve endings and structures innervated by them and further characterized by an enhanced rate of absorption while simultaneously overcoming the problems associated with prior art isoproterenol compounds.

The novel 3,4-dipivaloxy-α-[(isopropylamino)methyl] benzyl alcohol of this invention, which can also be conveniently named 1-(3,4-dipivaloxyphenyl)-2-(isopropylamino)ethanol or 3,4-dipivaloxy-1-[1-hydroxy-2-(isopropylamino)ethyl]-benzene is prepared by first contacting and reacting an α-halo-3,4-dihydroxyacetophenone with stoichiometric amounts, usually with an excess of the alkylamine; for example, with about 3 to 4 or more molecular equivalents of the alkylamine for each reactive halogen moiety present in the α-halo-3,4-dihydroxyacetophenone present as a reactant. The reaction is carried out in the presence of a suitable solvent, at a temperature of about 10°C to about 75°C, and at atmospheric pressure, or higher pressures of from 1 to about 10 atmospheres and the like. The reactants begin to react on contact, but it is generally preferable to carry out the reaction for about 10 minutes to about one hour to produce from the starting materials the corresponding product, α-isopropylamino-3,4-dihydroxyacetophenone.

Next, the hydroxyl groups of the product α-isopropylamino-3,4-dihydroxyacetophenone at positions C-3 and C-4 of the aryl ring are esterified by reacting an acylating agent with the hydroxyl group in an organic medium. Examples of acylating agents suitable for esterifying the hydroxyl groups include anhydrides, mixed anhydrides, the chloride of the appropriate alkanoic acid, and the like. The acylation is carried out by contacting and reacting the hydroxyl groups with, for example, an acid chloride pivalyl chloride, in the presence of a solvent, at a temperature of about 5°C to 100°C, usually at refluxing temperature, and at a pressure of 1 atmosphere or higher, for about 2 hours to 24 hours or longer. Generally, the reactants are present in equivalent amounts or in excess thereof, for example, 2 to 10 moles of acid chloride to 1 mole of hydroxyl reactant. The acylated product is recovered by precipitating with an organic solvent, followed by conventional organic extraction and reprecipitation with an aqueous media to yield the product α-isopropylamino-3,4-dipivaloxy acetophenone.

The aliphatic side chain keto functionality is conveniently reduced to the corresponding alcohol group very smoothly and in good yield by the catalytic hydrogenation of the α-isopropylamino-3,4-dipivaloxy acetophenone. Generally, the hydrogenation is carried out in the presence of a metal catalyst such as platinum, palladium, rhodium, platinium oxide and the like. The reduction of the ketone in a hydrogen environment is usually conducted at about 1 atmosphere to 3 atmospheres and at room temperatures, or with heating from about 20°C to 75°C. The catalytic hydrogenation is usually carried out in a standard Parr vessel, or the like. The carbonyl can also be reduced by standard methods such as metal hydride reduction, and the like. *Modern Synthetic Reactions*, by House, H. O., pages 1 to 22, 1965, published by W. A. Benjamin, Inc., New York.

The resolution of the racemate can be accomplished out by conventional standard resolution methods well known to those in the art as described in *Organic Chemistry*, by Fieser and Fieser, pages 270 to 281, 1944, published by D. C. Heath and Company, Boston; and, *Organic Chemistry*, by Morrison and Boyd, pages 231 to 233, 1969, published by Allyn and Boston, Inc., Boston.

The phrases, "pharmaceutically acceptable" and "non-toxic, acid addition salts" as used herein generally includes the non-toxic acid addition salts of the compounds of Formula 1, formed with non-toxic inorganic or organic acids. For example, the salts include those derived from inorganic acids such as hydrochloric, hydrobromic, sulfuric, sulfamic, phosphoric, nitric and the like; and the salts prepared from organic acids such as acetic, propionic, succinic, glycollic, stearic, lactic, malic, tartaric, citric, ascorbic, pamoic, maleic, hydroxymaleic, phenylacetic, glutamic, benzoic, salicylic, sulfanilic, fumaric, salicyclic, toluenesulfonic, and the like.

The pharmaceutically acceptable acid addition salts of the present invention can be synthesized from the compound embraced by Formula 1 by conventional, chemical methods. Generally, the salts are prepared by reacting the free base with stoichiometric amounts or with an excess thereof of the desired salt-forming inorganic or organic acid in a suitable solvent or various combination of solvents. For example, the free base can be dissolved in a mixed aqueous solution of the appropriate acid and the salt recovered by standard techniques, for example, by evaporation of the solution. Alternatively, the free base can be charged into an organic solvent such as a lower alkanol, a symmetrical or unsymmetrical ether containing 2 to 10 carbon atoms, an alkyl ester, or mixtures thereof, and the like, and then it is treated with the appropriate acid to form the corresponding salt. The salt is recovered by standard recovery techniques, for example, by filtration of the desired salt on spontaneous separation from the solution, or it can be precipitated by the addition of a solvent in which the salt is insoluble and recovered therefrom.

Examples of suitable inorganic and organic solvents for performing the various reactions include any inorganic or organic solvent that does not adversely affect the reactants or the resulting product including halogenated solvents such as methylene chloride, chloroform, carbon tetrachloride, ethylene chloride, ether solvents such as diethyl ether, dimethyl ether, and other solvents such as tetrahydrofuran, dioxane, diglyme, n-hexane, cyclooctane, benzene, heptane, cyclohexane, and mixtures thereof, and like aliphatic, cycloaliphatic and aromatic hydrocarbon solvents, water, acidified aqueous solutions, mixed organic and inorganic solutions, ethyl acetate, propyl acetate, and the like.

The following examples are set forth as representative methods illustrative of the spirit of the present invention. These examples are not to be construed as limiting the scope of the invention as other functionally equivalent means will by readily apparent to those skilled in the subject art in the light of the present specification and the accompanying claims.

EXAMPLE 1

Synthesis of 3,4-dipivaloxy-α-[(isopropylamino)methyl] benzyl alcohol. First, in an adaptation of the method of Corrigan et al; *J. Am. Chem. Soc.*, 71, 530–1 (1949), a mixture of 0.20 moles α-chloro-3,4-dihydroxyacetophenone, Compound 1, 0.66 moles isopropylamine, and 125 ml isopropanol is heated with stirring to 75°C, maintained at 75°C for 5 minutes, then allowed to cool to room temperature with stirring. The crude product separates during the reaction and is converted to the hydrochloride salt, Compound 2, by addition of the minimal amount of concentrated hydrochloric acid to give an acid solution. Overnight refrigeration precipitates the product salt which is recovered by addition of 500 ml acetone and filtration. The resulting crystalline product has m.p. 239°–242°C and is used without further purification.

Next, 0.125 mole of Compound 2 is dissolved in 250 ml ethyl acetate and 0.125 mole perchloric acid as a 70 percent aqueous solution is slowly added thereto with continuous stirring. Then, an excess of pivalyl chloride, Compound 3, 280 ml, is added and the mixture slowly warmed to reflux temperature. The reaction mixture is refluxed for about 5 hours and allowed to cool to room temperature with continuous stirring. The product is precipitated as the perchlorate salt by the addition of 500 ml ether. The product, Compound 4, is isolated and purified by dissolution in minimal boiling acetone, addition of hexane to incipient turbidity, and precipitation by overnight refrigeration.

Then, to 20 grams of Compound 4 dissolved in 200 ml 95% ethanol in a Parr reaction vessel is added 1.5 grams Adams catalyst, platinum oxide, and the mixture shaken under hydrogen at 50 psi for 1 hour at ambient temperature. The mixture is then filtered and the ethanol removed on a standard rotary evaporator. The resulting oil is dissolved in 200 ml water; the solution is neutralized with ammonium hydroxide and extracted exhaustively with chloroform. The combined chloroform extracts are dried over calcium chloride, filtered, and evaporated. The residue is dissolved in 200 ml ether and the product, Compound 5, precipitated as the hydrochloride salt by introduction of excess gaseous hydrogen chloride. The product is purified by dissolution in minimal boiling acetone, addition of hexane to incipient turbidity, and overnight refrigeration. The crystalline material thus obtained has m.p. 153°–5°C. This sequence is outlined below.

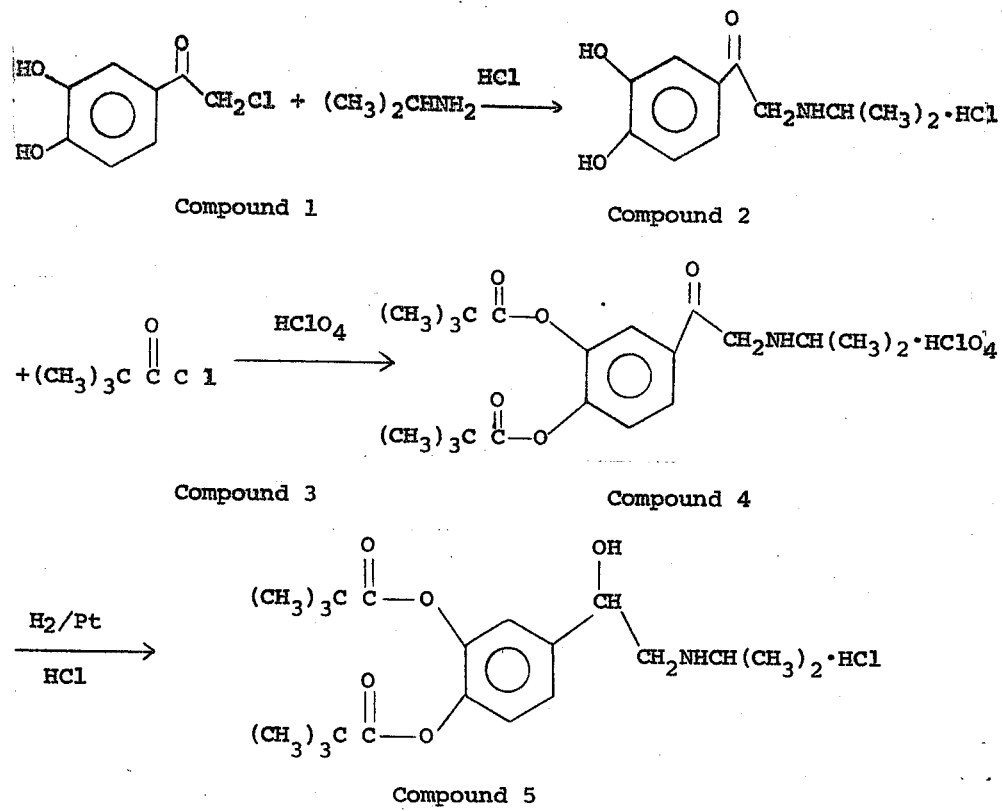

EXAMPLE 2

The reaction procedure of Example 1 leading to 3,4-dipivaloxy-α-[(isopropylamino)methyl]benzyl alcohol can also be carried out by optionally starting with commercially available catechol, Compound 6 below, reacting it with stoichiometric amounts, usually a slight excess of chloroacetyl chloride, Compound 7. The intermediate chloroacetyl catechol, Compound 8, is then reacted with methylamine $HN_2CH_3$, Compound 9, and the reaction then is carried through the remaining procedure of Example 1 to give the product. The starting reaction of Example 2 is as follows:

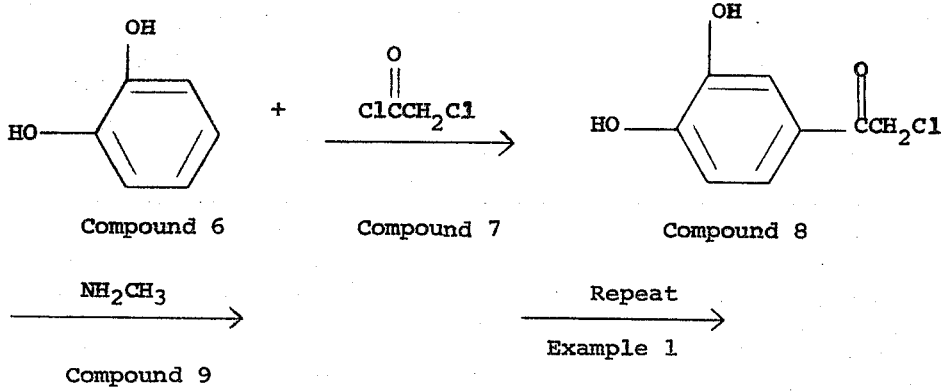

The novel compound and its pharmaceutically acceptable salts can be used by the pharmaceutical and the veterinary arts for treating bronchial asthma including hay fever and allergic rhinitis in a variety of pharmaceutical preparations. The new compound and its non-toxic salts are thus administrable in the form of injectables, solutions, suppositories, ointments, emulsions, jellies, buccal patches, oral inhalants, nasal inhalants, aerosols, and in other suitable forms. The pharmaceutical or veterinary preparation which contains the compound is conveniently admixed with from about 0.1 micrograms to 10 grams of a non-toxic pharmaceutical organic or inorganic carrier. Typical of pharmaceutically acceptable carriers are, for example, water, mixtures of water and water-misicible solvents such as lower alkanols or aralkanols, vegetable oils, polyakylene glycols, petroleum based jelly, ethyl cellulose, ethyl oleate, carboxymethylcellulose, polyvinylpyrrolidone, isopropyl myristate and other conventionally employed acceptable carriers. The pharmaceutical preparation may also contain non-toxic auxiliary substances such as emulsifying, preserving, wetting agents, bodying agents and the like, as for example, polyethylene glycols 200, 300, 400 and 600, carbowaxes 1,000, 1,500, 4,000 and 10,000, bacterial components such as quaternary ammonium compounds, phenylmercuric salts known to have cold sterilizing properties and which are non-injurious in use, thimerosal, propyl paraben, buffering ingredients such as sodium chloride, sodium borate, sodium acetate, gluconate buffers, and other conventional ingredients such as sorbitan monolaurate, thiethanolamine oleate, polyoxyethylene sorbitan monopalmitylate, dioctyl sodium sulfosuccinate, monothioglycerol, thiosorbitol, ethylenediamine tetracetic acid, and the like. Additionally, suitable vehicles can be used as carrier media for the present purpose including conventional phosphate buffer vehicle systems, isotonic boric acid vehicles, isotonic sodium chloride vehicles, isotonic sodium borate vehicles, and the like.

Exemplary of a typical method for preparing a solution to be used with conventional nebulizers containing 3,4-dipivaloxy-α-[(isoprypylamine)methyl]benzyl alcohol salt, sodium chloride, chlorobutanol, oxime sulfate and distilled water is as follows: first a measured quantity of chlorobutanol is dissolved in 500 milliliters of distilled water with stirring and optionally using gentle heat to form a solution. Then, sodium chloride, oxime sulfate and 3,4-dipivaloxy-α-[(isopropylamino)methyl]benzyl alcohol hydrochloride is added and the solution stirred until clear. Next, distilled water is added to the liter mark and the solution filtered through a conventional filter having an 0.2 to 0.4 micron pore size. The solution will have a shelf-life stability of 3 years at 4°C and its compositional form is as follows:

| Ingredients | Per Liter, gm. |
|---|---|
| 3,4-dipivaloxy-α-[(isopropylamino) methyl]benzyl alcohol bitartrate | 2.0 |
| Sodium chloride | 8.0 |
| Chlorobutanol | 5.0 |
| Oxime sulfate | 0.1 |
| Distilled water | qs. 1 liter |

A second pharmaceutical formulation similar to the formulation prepared immediately above is made by following that procedure except that the amount of 3,4-dipivaloxy-α-[(isopropylamino)methyl]benzyl alcohol hydrochloride is increased to 10 grams and 2% phenylethyl alcohol is used as the preservative.

A novel lyophilized pharmaceutical preparation for subsequent reconstitution immediately before therapeutic administration is prepared as follows: first, 4 grams of 3,4-dipivaloxy-α-[(isopropylamino)methyl]benzyl alcohol hydrochloride and 8 grams of mannitol U.S.P. are mixed with agitation into 1 liter of distilled water and the solution formed filtered through a sterile filter. Then, 5 cc to 12 cc of the solution is transferred to amber vials and lyophilized by conventional methods until the freshly forming cake is dry. The lyophilized, dry cake is reconstituted with 10 cc of a diluent containing the following: 2 grams sodium chloride, 5 grams of chlorobutanol, 0.1 gram of oxime sulfate, mixed with distilled water to the volume line in a 1000 milliliter volumetric flask.

The lyophilized cake can optionally be prepared by replacing the mennitol with buffering agents such as a mixture of sodium chloride and sodium dihydrogen phosphate, or a mixture of potassium chloride and either potassium acetate or sodium acetate.

Exemplary of formulations suitable for inhalation therapy include those formulations that can be administered from nebulizers of the squeeze-bulb, reservoir, Venturi effect assembly, pressurized dispensers using chloroflurohydrocarbon propellants, pre-micronized powders in liquid propellants, liquid-vapor phase aerosols, and the like. Typically, the formulation suitable for a conventional nebulizer optionally is comprised of 0.4 to 0.8 percent solution of 3,4-dipivaloxy-$\alpha$-[(isopropylamino)methyl]benzyl alcohol hydrogen chloride in a buffered carrier comprised of sodium chloride, sodium citrate, glycerine and a trace of preservative. In one embodiment the air in the dispenser can be displaced with nitrogen gas. A typical pressurized dispenser can optionally be 0.20 to 0.50 percent on a weight by weight basis of 3,4-dipivaloxy-$\alpha$-[(isopropylamine)methyl] benzyl alcohol in a mixture of dichlorodifluoromethane and dichlorotetrafluoroethane with a sodium lactate lactic acid buffer, about 30 to 40 percent weight by weight of an alkanol and aromatic flavoring agents. Other formulations containing the compound of the invention suspended in fluorochlorocarbons containing sorbitan trioleate and the like can also be used for administering the compound.

The dose administered, whether a single dose or a daily dose, will, or course, vary because of the chosen route of administration, and the size of the recipient. The dosage administered is not subject to definite bounds, but it will usually be an effective amount, or the equivalent on a molar basis of the pharmacologically active form produced upon the metabolic release of the active drug to achieve its desired pharmacological and physiological effect. The medical dose for warm-blooded mammals, including humans and primates by the intramuscular or subcutaneous route will be about 100 micrograms to 5 milligrams administered in 0.1 to 1.5 ml of a 0.1 to 0.5 percent oil suspension, with the usual intramuscular dose of 200 to 750 micrograms in 0.2 to 0.75 ml of a 0.1 to 0.5 percent solution. For oral inhalation the dose is about 0.01 to 2.0 percent applied as a fine mist. For typical application in operative procedures on the nose and throat, solutions of 0.002 to 0.975 percent may be used. Generally, the dosage form for a typical non-toxic salt, for example, the hydrochloride in a solution intended for inhalation will be about 0.025 to 4 percent and the like. The dose for farm animals is generally about 4 to 10 ml by the subcutaneous or intramuscular route for horses and cattle and for dogs about 0.2 to 0.6 ml, and the like.

The unexpected, pronounced pharmacological properties for the compound of the invention and its non-toxic salts are demonstrated by using standard art known testing procedures. For example, the antiasthmatic effect of the compound of the invention is demonstrated as follows: first, adult, male guinea pigs are exposed to the nebulized spray of a 0.2 percent weight by volume spray of 3,4-dihydroxy-$\alpha$-[(isopropylamino)methyl]benzyl alcohol equivalent in saline solution for 2 minutes in an inhalation chamber. With the control animals, only saline solution is nebulized. Next the animals are exposed to a histamine challenge 10 minutes after exposure to the various tested compounds. The histamine challenge consists in exposing the animals to the spray of a 0.2 percent weight by volume histamine diphosphate solution, and then recording the time before the onset of the first seizure. All the compounds were tested on a 3,4-dihydroxy-$\alpha$-[(isopropylamino)methyl]benzyl alcohol basis, and the observed times are set forth in Table 1.

TABLE 1

| Compound | Delay Before Onset Of Seizure in Min. |
|---|---|
| Control | 1 – 2 |
| 3,4-dihydroxy-$\alpha$-[(isopropylamino)methyl]benzyl alcohol hydrchloride | 5.5 |
| 3,4-diacetoxy-$\alpha$-[(isopropylamino)methyl]benzyl alcohol hydrochloride | 4 |
| 3,4-dipropionoxy-$\alpha$[(isopropylamino)methyl]benzyl alcohol hydrochloride | 5 |
| 3,4-diisobutryoxy-$\alpha$-[(isopropylamino)methyl]benzyl alcohol hydrochloride | 5 |
| 3,4-dipivaloxy-$\alpha$-[(isopropylamino)methyl]benzyl alcohol hydrochloride | 8 – 10 |

The enhanced stability of the compound is ascertained and compared against other compounds by measuring its rate of hydrolysis in a pH 4.5 acetate buffer solution at room temperature and expressing the results as $t_{1/2}$ days. The test solutions had a concentration of 0.5 milligrams per milliliter, and the rate of hydrolysis was measured in a spectrophotometer at 280 mu. The results are set forth in Table 2. Also in the same table is set forth the rate of auto-oxidation of an 0.2 percent solution at a pH of 4 in an air oxidative environment. These results are set forth as the time for color formation, pink to brown, to develop in days from the first exposure of the solution to the environment.

TABLE 2

| Compound | Hydrolysis $t_{1/2}$ | Oxidation Days |
|---|---|---|
| 3,4-dihydroxy-$\alpha$-[(isopropylamino)methyl]benzyl alcohol hydrochloride | | 15 |
| 3,4-diacetoxy-$\alpha$-[(isopropylamino)methyl]benzyl alcohol hydrochloride | 30 | 20 |
| 3,4-dipropionoxy-$\alpha$-[(isopropylamino)methyl]benzyl alcohol hydrochloride | 34 | 35 |
| 3,4-diisobutyroxy-$\alpha$-[(isopropylamino)methyl]benzyl alcohol hydrochloride | 50 | 35 |
| 3,4-dipivaloxy-$\alpha$-[(isopropylamino)methyl]benzyl alcohol hydrochloride | 700 | 300 |

The rate of cleavage of these compounds to the parent drug is demonstrated in various biological media by measuring its enzymatic rate of hydrolysis in various media at 37°C and expressing this result as the $t_{1/2}$ seconds. The enzymatic rate of hydrolysis is measured at pH of about 7.5 and at a concentration of 0.5 mg/ml of compound in media (a) horse serum cholinesterase, (b) rabbit serum, and (c) human plasma. The results for the compound are listed in Table 3, as are the results of other compounds treated in a like enzymatic environment. The free base compound was measured by using high pressure liquid chromatography.

TABLE 3

| Compound | Rate of Hydrolysis in $t_{1/2}$ Seconds | | |
|---|---|---|---|
| | Horse | Rabbit | Human |
| 3,4-diacetoxy-$\alpha$[(isopropylamino)methyl]benzyl alcohol hydrochloride | 20 | 45 | 180 |
| 3,4-dipropionoxy-$\alpha$-[(isopropylamino)methyl]benzyl alcohol hydrochloride | 50 | 90 | 240 |
| 3,4-dibutyroxy-$\alpha$-[(isopropylamino)methyl]benzyl alcohol hydrochloride | 100 | 160 | 360 |
| 3,4-dipivaloxy-$\alpha$[(isopropylamino)methyl]benzyl alcohol hydrochloride | 600 | 720 | 1800 |

The additional benefits of the compounds of the invention are demonstrated by its selectivity of action. For example, the prior art compound can cause increases in heart-rate and blood pressures when used as an anti-asthmatic, whereas, the compound of the invention has no such effects. The selectivity of the compound of the invention is demonstrated as follows:

First, adult male rats or guinea pigs are fitted with chronically implanted aortic catheters; Bunag, Ruben D., *Journal of Laboratory and Clinical Medicina*, 78, 675–682 (October, 1971), St. Louis, Mo. The indwelling catheter is then attached to a device for recording pressure changes. (A Statham P23Gb strain gage, for example.)

The test compound is administered as an intravenous solution or by means of a nebulized mist. The observed heart-rate and blood pressures are set forth in Table 4 below:

TABLE 4

| Compound | Dose By Inhalation | Change In Heart Rate | Change In Blood Pressure |
|---|---|---|---|
| 3,4-dihydroxy-α1[(isopropyl-amino)methyl]benzyl alcohol hydrochloride | 0.4% | 100 Beats/min | 30 mm Hg |
| 3,4-dipivaloxy-α1[(isopropyl-amino)methyl]benzyl alcohol hydrochloride | 0.4% | 2 Beats/min | 0–5 mm Hg |
| 3,4-dihydroxy-α1[(isopropyl-amino)methyl]benzyl alcohol hydrochloride | 1.25 ug/ml I.V. | 50 Beats/min | |
| 3,4-dipivaloxy-α1[(isopropyl-amino)methyl]benzyl alcohol hydrochloride | 10 ug/ml I.V. | 0 Beats/min | |

The above examples and disclosure are set forth merely for illustrating the mode and the manner of the invention, and, while various modifications and embodiments can be made by those skilled in the art, in the light of this invention, they are made without departing from the spirit of the invention. It is intended, therefore, that the invention be limited only by the scope of the claims which follow.

What is claimed is:
1. A compound of the formula

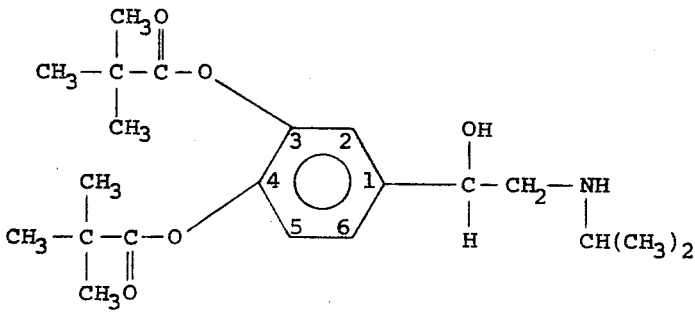

or a pharmaceutically acceptable acid addition salt thereof.

2. A compound according to claim 1 wherein the compound is 3,4-dipivaloxy-α -[(isopropylamino)methyl]benzyl alcohol.

3. A compound according to claim 1 wherein the compound is racemic 3,4-dipivaloxy-α -[(isopropylamino)methyl] benzyl alcohol.

4. A compound according to claim 1 which is an optical isomer of 3,4-dipivaloxy α -[(isopropylamino)methyl]benzyl alcohol.

5. A pharmaceutical composition for treating asthma comprising an effective amount of a member selected from the group consisting of 3,4-dipivaloxy-α -[(isopropylamino)methyl] benzyl alcohol and its therapeutically acceptable acid addition salts, admixed with a pharmaceutically acceptable carrier.

6. A pharmaceutical composition according to claim 5 wherein the unit dosage amount consists of from 0.1 micrograms to 10 grams of 3,4-dipivaloxy-α -[(isopropylamino)methyl]benzyl alcohol admixed with a pharmaceutically acceptable carrier.

7. A pharmaceutical composition according to claim 5 wherein the composition consists of 0.01% to 2% of 3,4-dipivaloxy-α-[(isopropylamino)methyl]benzyl alcohol and the carrier is a therapeutically acceptable inhalation carrier.

8. A method for relieving asthma in a warm-blooded animal which method comprises administering an inhalation composition comprising an inhalation vehicle and 0.01 to 2 percent of a member selected from the group consisting of 3,4-dipivaloxy-α-[(isopropylamino)methyl]benzyl alcohol and a nontoxic acid addition salt thereof.

* * * * *